United States Patent [19]

Moeglich

[11] 4,212,724
[45] Jul. 15, 1980

[54] OXIDATION AND COAGULATION FOR AQUARIUM APPLICATIONS

[75] Inventor: Karl Moeglich, Dunedin, Fla.

[73] Assignee: Innova, Inc., Clearwater, Fla.

[21] Appl. No.: 963,940

[22] Filed: Nov. 21, 1978

[51] Int. Cl.$^2$ .............................................. C02B 1/82
[52] U.S. Cl. .................................... 204/273; 204/1 R;
204/149; 204/152; 204/268; 204/275
[58] Field of Search ............... 204/1 R, 152, 149, 260,
204/272, 273, 289, 268, 275

[56] References Cited

U.S. PATENT DOCUMENTS

| | | | |
|---|---|---|---|
| 3,945,892 | 3/1976 | James et al. ........................ | 204/1 R |
| 3,966,571 | 6/1976 | Gagnon et al. .................... | 204/1 R X |
| 4,121,991 | 10/1978 | Miller et al. ....................... | 204/1 R X |
| 4,144,148 | 3/1979 | Kammel et al. ................... | 204/152 X |

*Primary Examiner*—Arthur C. Prescott
*Attorney, Agent, or Firm*—Cushman, Darby & Cushman

[57] ABSTRACT

The invention relates to an oxidation and coagulation apparatus and method especially suitable for use with aquariums (especially salt-water aquariums). Water is withdrawn from the aquarium by a pump, and is fed into the oxidizer and coagulator. The oxidizer and coagulator includes a chamber into which the pump discharges water under pressure, a plurality of electrodes disposed in the chamber and connected up to a source of e.m.f. (AC), a plurality of electrically conductive particles (e.g., graphite) disposed in the chamber, a structure for violently continuously circulating the particles within the chamber so that they continuously impact all of the electrodes, and structure for preventing movement of the electrically conductive particles out of the chamber. An outlet is provided from the chamber and a filter is provided for separating particles and coagulants from the water after discharge from the chamber, and then returning the now-purified water to the aquarium. The electrodes may be stainless steel, yet they will not rust even over extended operation in purifying salt water.

16 Claims, 4 Drawing Figures

OXIDATION AND COAGULATION FOR AQUARIUM APPLICATIONS

BACKGROUND AND SUMMARY OF THE INVENTION

The invention relates to an oxidation/coagulation system for the purification of water, primarily for use with aquariums. A generally similar system for aqueous electroytes is disclosed in co-pending application Ser. No. 841,925 filed Oct. 13, 1977, now U.S. Pat. No. 4,161,435, the disclosure of which is hereby incorporated by reference herein.

In treating water to be inhabited by aquatic life, especially for limited volume systems such as aquariums, it is necessary and/or desired to eliminate organic and inorganic metabolites, eliminate particulate matter in suspension, eliminate colloidal matter, eliminate yellowing or organic dyes, and destroy pathogens (bacteria, viruses, fungus, parasites and their spores). At present, in order to accomplish all of the above results even moderately effectively, it is necessary to provide a large amount of diverse equipment. For instance, organic and inorganic metabolites and decay products are removed by biological gravel filters, ozonation, foam fractionation, or activated carbon. However, activated carbon tends to remove vitral trace elements, and other systems have other disadvantages associated therewith. Particulate matter is removed by mechanical filters, and colloidal matter is only partially removed by mechanical filters. Organic dyes are removed by activated carbon which—as mentioned above—has the disadvantage of removing vital trace elements, and pathogens are destroyed by ozonation in ultraviolet light.

According to the present invention, it is possible to accomplish all the desirable results mentioned bove (i.e., elimination of metabolites, elimination of particulate matter in suspension, etc.) in a simple and effective manner, utilizing simple, relatively inexpensive equipment.

According to the apparatus of the present invention, a water purification assembly is provided comprising means for withdrawing water from a water source (aquarium); means for effecting oxidation and coagulation of metabolites in the water, the means comprising a chamber into which the withdrawing means feeds water, a plurality of electrodes disposed in the chamber and connected up to a source of e.m.f., a plurality of electrically conductive particles each with a relatively large surface area configuration disposed in the chamber, means for violently continuously circulating the particles within the chamber so that they can continuously impact all of the electrodes, and means for preventing movement of the electrically conductive particles out of the chamber; an outlet from the chamber; and means connected to the chamber outlet for mechanically separating particles and coagulants from the water and then returning the now-purified water to the water source. The violent, continuous circulation may be provided by a nozzle formed in a conduit from a pump which provides the withdrawing means. The stream of water under pressure from the pump being directed downwardly in the chamber and circulating the particles downwardly, around a curved surface, upwardly, and then flowing back downwardly to be entrained in the flow again. The curved surface may be perforated and the outlet disposed on the opposite side thereof.

The electrodes are preferably disposed horizontally and can be made of stainless steel, graphite, platinum-coated titanium or the like. The mechanical separating means may comprise a diatomaceous earth filter or the like, and conduit means are provided between the chamber and the mechanical separation means to insure that air bubbles entrained in the water from the chamber are released to the atmosphere before being fed to the filter. All of the components can be mounted directly adjacent and/or on a conventional aquarium. If desired, a pre-filter may be provided between the withdrawing means and the chamber for removing large particulates.

According to the preferred method of the present invention, the purification of salt water is effected by oxidation and coagulation of metabolites in the water utilizing the chamber having a plurality of stainless steel horizontally disposed electrodes therein which are connected up to an e.m.f. source, the purification being effected without rusting of the electrodes even over extended operation and practice of the method. The method comprises the steps of disposing a plurality of conductive particles in the chamber, each particle having a relatively large surface area configuration and being denser than salt water; feeding water into the chamber; continuously and violently circulating the particles in the chamber in a flow path so that they continuously impact all of the electrodes; withdrawing water from the chamber after passage thereof between at least some of the electrodes and particles while preventing removal of the particles; and mechanically separating particles and coagulants from the water withdrawn from the chamber. The voltage applied by the e.m.f. source, which preferably is AC, is such that a maximum density of about 0.5 amp./in.$^2$ is provided. The circulation path of the particles is normally generally downwardly, curving back upwardly, moving generally upwardly, and then eventually again moving downwardly in a random manner. The method may be as described above, and consisting essentially of the further step of pre-filtering water before feeding into the chamber, to remove large particles therefrom.

It is the primary object of the present invention to provide an improved method and apparatus for the oxidation and/or coagulation of water, especially for aquarium use. This and other objects of the invention will be clear from an inspection of the detailed description of the invention, and from the appended claims.

DETAILED DESCRIPTION OF THE DRAWINGS

Figure 1:
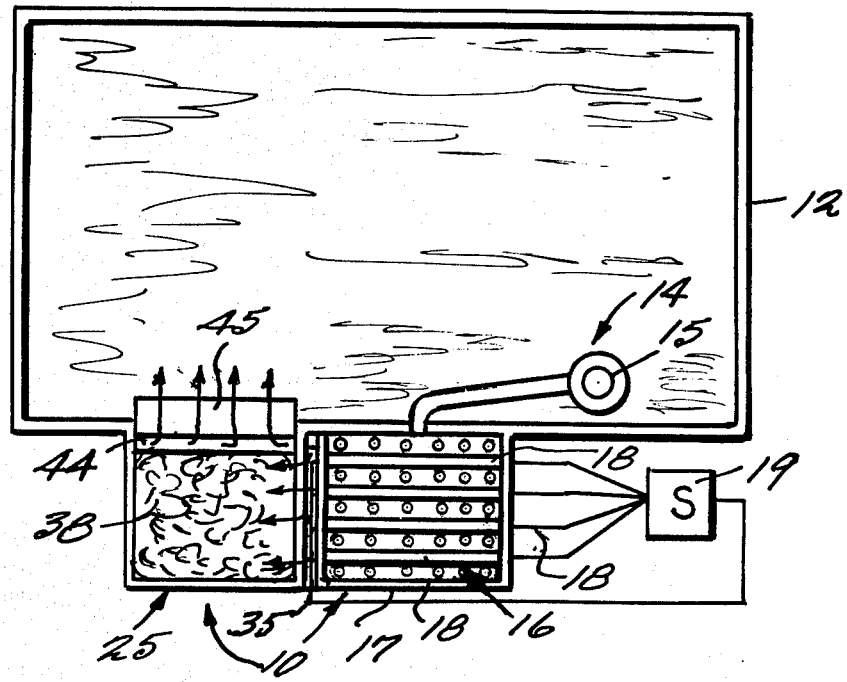
FIG. 1 is a top plan view of an exemplary assembly according to the present invention shown in use with an aquarium, but with no conductive particles shown in the oxidizer-coagulator for clarity.
Figure 2:
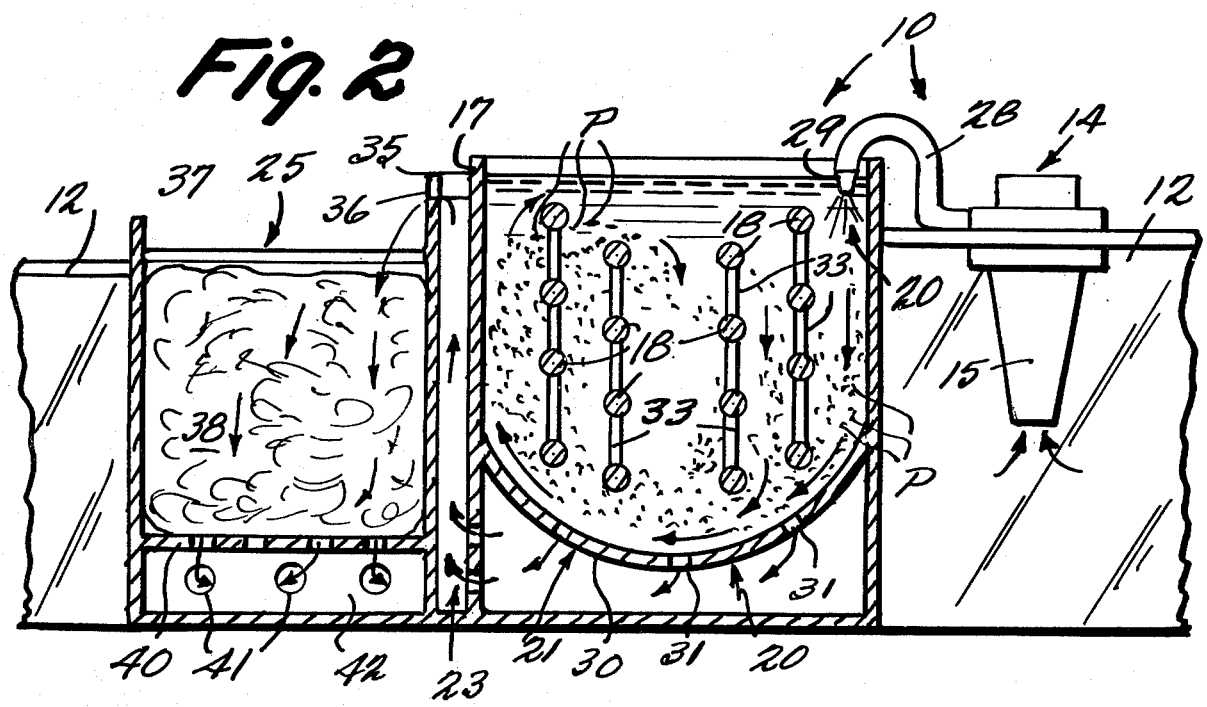
FIG. 2 is a side, cross-sectional, view of the apparatus of FIG. 1, with the aquarium being cut away for clarity.
Figure 3:
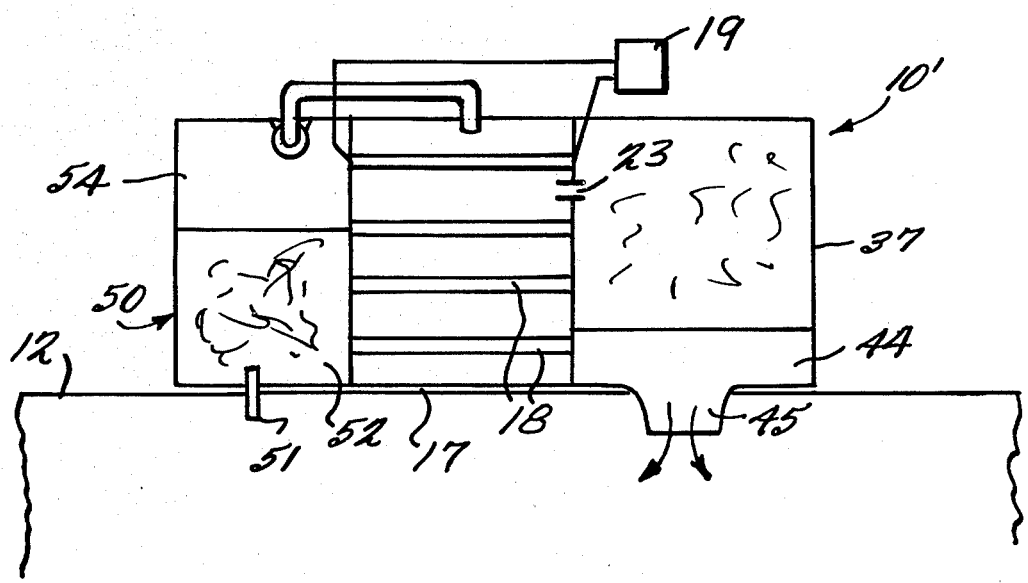
FIGS. 3 and 4 are top and side diagrammatic views of a modification of apparatus of FIG. 1.
Figure 4:
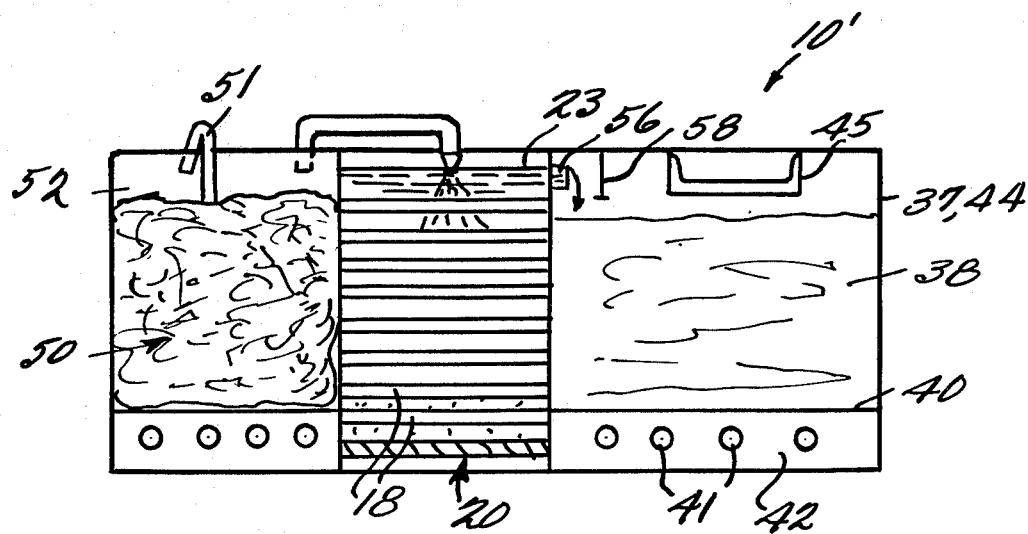

An exemplary water purification assembly according to the present invention is shown generally at 10 in FIGS. 1 and 2, and 10′ in FIGS. 3 and 4. The apparatus is especially suitable for use with a conventional aquarium 12, the assembly 10 being sized dependent upon the size of the aquarium 12, with which it is used. However, depending upon the size of the unit 10, it may be useful with other water sources too (e.g., ponds, rivers, or the like).

The means 10 according to the present invention comprises means 14 for withdrawing water from the aquarium 12, and means 16 for effecting oxidation and coagulation of metabolites in the withdrawn water. The means 14 may comprise a pump, air-lift, or the like, a centrifugal pump 15 being illustrated in FIGS. 1 and 2, having a long impeller shaft for facilitating suction of the water from the aquarium 12 into the pumping chamber. The oxidation and coagulation effecting means 16 comprises a chamber 17 into which the pump 15 feeds water, a plurality of electrodes 18, 18' connected up to a source 19 (see FIG. 1) of A.C. e.m.f.; a plurality of electrically conductive particles P (see FIG. 2), each with a relatively large surface area configuration, the particles P being disposed in the chamber 17; means 20 for violently continuously circulating the particles P within the chamber 17 so that they continuously impact all of the electrodes 18, 18'; and means 21 for preventing movement of the electrically conductive particles P out of the chamber 17.

The water purification assembly 10 further comprises an outlet 23 from the chamber, and means 25 connected to the chamber outlet 23, for mechanically separating particles and coagulants from the water, and then returning the now-purified water to the aquarium 12.

As illustrated in the embodiment of FIGS. 1 and 2, the continuously circulating means 20 comprises a conduit 28 from the pump 15 for introducing water from the pump into the chamber 17 under pressure, and in a generally downward direction, facilitating particle circulation around an impaction upon the electrodes 18. In order to increase the velocity of the water from the pump 15, preferably a nozzle 29 is formed at the end of the conduit 28. The circulating means further comprises a curved surface member 30 disposed opposite the electrodes 18 as the nozzle 29, the surface 30 being curved about an axis parallel to the electrodes 18, and the most widely horizontally spaced electrodes generally being spaced apart a horizontal distance less than the diameter of curvature of the member 30, as illustrated in FIG. 2. In the embodiment of FIGS. 1 and 2, the member 30 is perforated, and thus also comprises the means 21 for preventing movement of the electrically conductive particles P out of the chamber 17, water, pollutant particles, and coagulated proteins, and the like, being capable of passing through openings 31 in member 30, but the particles P being incapable of passing therethrough.

The particles P are preferably epoxy resin impregnated irregular graphite lumps, although a large variety of other conductive and semi-conductive particles of varying shapes, as set forth in co-pending application Ser. No. 841,925, now U.S. Pat. No. 4,161,435 may be provided, intermixed with non-conductive particles if desired; all such particles being in the scope of the present invention. A lump configuration of the particles P has generally been found most useful for the present application, however, other shapes, such as flakes, balls, and the like, also may be utilized.

The electrodes 18 are preferably mounted by opposite side walls of the chamber 17, so that they extend horizontally, substantially parallel to each other. The plurality of electrodes 18 may be provided in a plurality of vertical lines (see FIG. 2). All the electrodes in each vertical line are interconnected by a conductive strip extending therebetween and outside of the chamber 17, or the like, as indicated at 33 in FIG. 2. The various vertical lines of electrodes are horizontally spaced from each other and may be disposed at the relative vertical heights, illustrated in the drawings. The electrodes 18 are dimensioned and the output of the A.C. source adjusted so that the maximum current density of the electrodes is about 0.5 amp./in.$^2$ (for stainless steel).

In order to prevent the carryover of bubbles from the chamber 17 to the separating means 25, which could have disruptive effects upon the mechanical separation by the means 25, conduit means 35 or the like are provided disposed between the chamber 17 outlet 23, and the inlet for the mechanical separating means 25. The conduit means 35 preferably merely comprises a vertical column which is open at the top, and spills over an edge 36 into a chamber 37 of the means 25, water from outlet 23 ultimately being passed downwardly into the chamber 37.

The means 25 preferably comprises a diatomaceous earth mass 38, although other suitable mechanical filters may also be provided. After passing through the filter 38, the water passes through the perforated bottom wall 40 supporting the filter 38, and then through openings 41 in side wall 42, defining an open area below the member 40. The water then passes from the openings 41 into the vertically extending column 44 (see FIG. 1) adjacent a wall of the aquarium 12, the water ultimately overflowing over shelf 45 into the aquarium 12.

In utilizing the apparatus of FIGS. 1 and 2, according to the present invention the electrodes 18 may be formed of stainless steel and may be utilized in conjunction with a salt water aquarium without rusting of the electrodes even over extended operation (the term "extended operation" in the present specification and claims meaning hundreds of hours of operation, if not months and years).

A system generally as illustrated in FIGS. 1 and 2 was used with a salt-water aquarium containing aquatic life therein. Utilizing the assembly 10, it was possible to maintain the pH in the safe range for salt water aquaria (8.0 to 8.2), color was removed from the water resulting in 99% transmission after a short period of operation and all odor was eliminated from the aquarium despite periodic application of over-doses of food. The electrodes 18, 18' were stainless steel, and the particles P were epoxy resin impregnated graphite lumps. The source of e.m.f. 19 was an A.C. source and provided a maximum voltage of 5.0 volts, with a 6 amp. maximum current, the current density on the electrodes being 0.09 amps/square inch. The residence time in the chamber 17 was dependent on the ratio of chamber 17 volume to the system (i.e., aquarium) volume. Even though the water was originally high in nitrite (NO$_2$), essentially all traces of nitrite were removed in a matter of hours after the start of operation. The unit was operated for more than a month, and during the entire period kept the water substantially color and odor-free, and there were no signs of stress on the fish despite a heavier than usual feeding periodically applied. Even after several series of tests over approximately a one month period, rusting of the electrodes 18 did not take place as long as the current density was maintained at reasonably low levels (e.g., below 0.5 amp./in.$^2$).

The assembly 10 according to the present invention illustrated in FIGS. 1 and 2 having been described, a typical method of operation thereof will now be set forth.

Water is continuously withdrawn from the tank 12 by the pump 15, and pumped through conduit 28 and nozzle 29 into the chamber 17, being downwardly directed and effecting circulation of the conductive particles P in chamber 17 in a flow path generally indicated by the arrows in FIG. 2, the particles P continuously and randomly impacting upon all of the electrodes 18 during this violent circulation. Some of the water passes through the openings 31 in the bottom of the curved surface 30, passes through the outlet 23 for chamber 17, up the conduit means 35, over the ledge 36, and downwardly into the chamber 37. The water then passes through the mechanical filter 38 wherein all particles and all proteins or the like that were caused to coagulate in the chamber 17 are filtered out. Oxidation takes place on the electrodes 18 and the particles P in the chamber 17. After passing through the filter 38, the water passes through the openings in the bottom plate 40, through the openings 41, up the chamber 44, and overflowing the ledge 45 back into the aquarium 12. A voltage is continuously applied to the electrodes 18, 18' by the source 19. In this manner, all of the water in the aquarium 12 is ultimately continuously treated, and kept free of odors, colors, and pollutants, while the pH is maintained at a safe level and no toxic metals or the like are introduced.

The modification illustrated in FIGS. 3 and 4 of the assembly 10' is basically similar to the assembly 10, with a few minor differences. One is that a pre-filter 50 is provided for filtering out large particles which otherwise would take up too much residence time in the chamber 17. The pre-filter 50 may be any suitable conventional mechanical filter. Also, in the FIGS. 3 and 4 embodiment, a siphon 51 is provided for siphoning water from the aquarium 12 into the pre-filter chamber 52, and then a pump or air-lift 53 is provided in a chamber 54 adjacent to the chamber 52, and in fluid communication (after a passage of the water through the pre-filter 50) therewith, the pump or air-lift 53 injecting water into the chamber 17 in much the same manner as in the FIGS. 1 and 2 embodiment. The outlet 23 for the chamber 17 is now provided at the top of the chamber 17 (see FIG. 4) and the means 21 for preventing movement of particles P out of the chamber 17 comprises a screen 56 or the like disposed at the opening 23. The conduit means 35 is a simpler arrangement, merely being a short passage 58 which directs water to an open top portion of chamber 37 before passing through the filter 38. The bottom plate 40, side wall 42 with openings 41, and column 44 with shelf 45, are substantially the same in the FIGS. 3 and 4 embodiment as in the FIGS. 1 and 2 embodiment.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A water purification assembly comprising
means for withdrawing water from a water source;
means for effecting oxidation and coagulation of metabolites in the water; said means comprising a chamber into which said withdrawing means feeds water; a plurality of naked electrodes disposed in said chamber and connected up to a source of e.m.f., the electrodes being stationary with respect to each other; a plurality of electrically conductive particles each with a relatively large surface area configuration disposed in said chamber; means for violently continuously circulating said particles within said chamber so that they continuously impact all of the electrodes; and means for preventing movement of said electrically conductive particles out of said chamber;
an outlet from said chamber; and
means connected to said chamber outlet for mechanically separating particles and coagulants from the water, and then returning the now purified water to the water source.

2. An assembly as recited in claim 1 wherein said continuously circulating and movement preventing means comprise a member having openings formed therein large enough to allow the passage of coagulants and pollutant particles therethrough, said member being disposed between the inlet of water into said chamber and said chamber outlet, and having surface means for directing the path of electrically conductive particles in said chamber.

3. An assembly as recited in claim 2 wherein said continuously circulating means further comprises a conduit from said withdrawing means for introducing water from said withdrawing means into said chamber under pressure and volume conditions sufficient to effect particles cirulcation, and in a direction faciiitating particles circulation around and impaction upon said electrodes.

4. An assembly as recited in claim 2 wherein said member comprises a rigid perforated member having a bottom portion curved about a horizontal axis, and having a diameter of curvature larger than the horizontal spacing between the most widely spaced electrodes.

5. An assembly as recited in claim 1 wherein said continuously circulating means comprises a conduit from said withdrawing means for introducing water from said withdrawing means into said chamber under pressure, and in a generally downward direction, facilitating particles circulation around and impaction upon said electrodes.

6. An assembly as recited in claim 1 wherein said source of e.m.f. to which said electrodes are connected is an A.C. source, and further comprising means for mounting said electrodes so that they extend horizontally, substantially parallel to each other.

7. An assembly as recited in claim 6 wherein said plurality of electrodes are disposed in a plurality of horizontally spaced vertical lines, each electrode in each line being vertically spaced from the others in the line.

8. An assembly as recited in claim 6 wherein the electrodes are dimensioned and the output of the A.C. source is adjusted so that the current density of the electrodes does not excees 0.5 amp./in.$^2$.

9. An assembly as recited in claim 6 wherein said circulating means comprises a member having a curved surface, said surface being curved about an axis parallel to said electrodes, and the most widely horizontally spaced electrodes generally being spaced apart a horizontal distance less than the diameter of curvature of said member.

10. An assembly as recited in claim 9 wherein said means for preventing movement of said electrically conductive particles out of said chamber comprise a strainer disposed at said outlet from said chamber.

11. An assembly as recited in claim 5 or 9, wherein said outlet from said chamber is disposed adjacent the top of said chamber.

12. An assembly as recited in claim 1, further comprising conduit means interconnecting said chamber outlet and said mechanically separating means for ensuring removal of bubbles from the water before it passes through said mechanically separating means.

13. An assembly as recited in claim 1, wherein said water source is an aquarium and further comprising means for mounting said oxidation effecting means and said mechanically separating means so that the water returns to said aquarium from said mechanically separating means at a position above said aquarium.

14. An assembly as recited in claim 1, wherein said withdrawing means comprises a centrifugal pump with an elongated impeller, the impeller being disposed in the water.

15. An assembly as recited in claim 1, further comprising a pre-filter disposed between said oxidation and coagulation effecting means and the source of water, said pre-filter for removing large particulates.

16. An assembly as recited in claim 1 wherein the electrically conductive particles are epoxy resin impregnated graphite lumps.

* * * * *